US005644072A

United States Patent [19]

Chirco et al.

[11] Patent Number: 5,644,072

[45] Date of Patent: Jul. 1, 1997

[54] EVAPORATIVE EMISSIONS TEST APPARATUS AND METHOD

[75] Inventors: Peter R. Chirco, Sterling Heights; R. Clayton McKeon, Holland, both of Mich.

[73] Assignee: K-Line Industries, Inc., Holland, Mich.

[21] Appl. No.: 559,760

[22] Filed: Nov. 13, 1995

Related U.S. Application Data

[63] Continuation-in-part of Ser. No. 218,350, Mar. 28, 1994, Pat. No. 5,507,176.

[51] Int. Cl.[6] .................... G01M 3/32

[52] U.S. Cl. .................... 73/49.2; 73/49.7

[58] Field of Search .................... 73/49.2, 49.7, 73/40.7, 40; 123/518, 519, 520

[56] References Cited

U.S. PATENT DOCUMENTS 3,014,361 12/1961 Black .
3,583,210 6/1971 Orr .................... 73/49.2
3,683,878 8/1972 Rogers .
4,235,100 11/1980 Branchini .................... 73/49.7
4,497,290 2/1985 Harris .
4,641,623 2/1987 Hamburg .................... 123/578
4,715,214 12/1987 Tveter et al. .................... 73/49.2
4,794,790 1/1989 Margarit-Mextaxa et al. .

(List continued on next page.)

FOREIGN PATENT DOCUMENTS 275441 1/1990 Germany .

OTHER PUBLICATIONS

Exhibit A discloses an "all manual" fuel tank assembly leak tester made by or for K-Line Industries, the assignee of the present application, which has been used by Ford Motor Company for more than one year to pressure test fuel tank assemblies for fuel leaks. The leak tester includs two styles of special filler caps configured to interface a fuel tank filler neck and sealingly cover same, a pressure regulator, a pressure gage, hoses and connectors for connecting the hoses, and aluminum plugs to seal off all fuel vapor hoses and fuel lines to the fuel tank assembly.

(List continued on next page.)

*Primary Examiner*—Hezron E. Williams
*Assistant Examiner*—Daniel S. Larkin
*Attorney, Agent, or Firm*—Price, Heneveld, Cooper, DeWitt & Litton

[57] ABSTRACT

A portable emissions test apparatus for testing for vapor emitting leaks in a fuel holding system in a vehicle includes a pressurizing system and a pressure-monitoring system. The pressurizing system includes a first pressure regulator configured for connection to a source of pressurized gas for regulating a maximum first pressure in the apparatus downstream of the first pressure regulator, and a first surge protector connected to the first pressure regulator for controlling first surges from the first pressure regulator. The pressurizing system further includes an adjustable second pressure regulator operably connected to the first surge protector for adjustably regulating a second pressure of pressurized gas for operating the apparatus, the second pressure regulator including an adjustment knob positioned in a readily accessible position on the apparatus so that the pressure downstream of the second pressure regulator can be adjusted for changes in ambient atmospheric pressure. A line operably connects the second pressure regulator to the fuel holding system. The pressure-monitoring system includes a pressure sensor connected to the line for measuring the pressure of the atmosphere in the fuel holding system, a timer for indicating passage of a predetermined amount of time, and a switch for actuating the timer when the second pressure is reached in the atmosphere in the fuel holding system. The pressure-monitoring system also includes an indicator operably connected to the pressure sensor, the timer and the switch, the indicator being configured to indicate that a change in the pressure of the atmosphere over the predetermined time is acceptable or unacceptable.

29 Claims, 6 Drawing Sheets

U.S. PATENT DOCUMENTS

| | | | |
|---|---|---|---|
| 4,867,126 | 9/1989 | Yonekawa et al. | 123/520 |
| 4,942,758 | 7/1990 | Cofield | 73/49.2 |
| 4,949,695 | 8/1990 | Uranishi et al. | 123/520 |
| 4,953,514 | 9/1990 | Beicht et al. | 123/520 |
| 4,962,744 | 10/1990 | Uranishi et al. | 123/520 |
| 5,022,364 | 6/1991 | Phillips | 73/40 X |
| 5,042,290 | 8/1991 | Geisinger | 73/40 X |
| 5,065,350 | 11/1991 | Fedder | 73/40 X |
| 5,078,006 | 1/1992 | Maresca, Jr. et al. | 73/40.5 R |
| 5,080,078 | 1/1992 | Hamburg | 123/519 X |
| 5,081,864 | 1/1992 | Zaim | 73/49.2 |
| 5,085,194 | 2/1992 | Kuroda et al. | 123/520 X |
| 5,085,197 | 2/1992 | Mader et al. | 123/520 |
| 5,095,880 | 3/1992 | Ricks | 123/516 |
| 5,105,653 | 4/1992 | Konter | 73/49.2 |
| 5,105,789 | 4/1992 | Aramaki et al. | 123/520 |
| 5,143,035 | 9/1992 | Kayanuma | 123/520 X |
| 5,146,902 | 9/1992 | Cook et al. | 123/518 |
| 5,150,689 | 9/1992 | Yano et al. | 123/519 |
| 5,158,054 | 10/1992 | Otsuka | 123/520 X |
| 5,186,153 | 2/1993 | Steinbrenner et al. | 123/519 |
| 5,191,870 | 3/1993 | Cook | 123/520 |
| 5,193,511 | 3/1993 | Fujino | 123/520 |
| 5,193,512 | 3/1993 | Steinbrenner et al. | 123/520 |
| 5,195,498 | 3/1993 | Siebler et al. | 123/520 X |
| 5,197,442 | 3/1993 | Blumenstock et al. | 123/520 |
| 5,205,263 | 4/1993 | Blumenstock et al. | 123/520 |
| 5,220,896 | 6/1993 | Blumenstock et al. | 123/520 |
| 5,239,858 | 8/1993 | Rogers et al. | 73/40.7 |
| 5,245,973 | 9/1993 | Otsuka et al. | 123/518 |
| 5,259,353 | 11/1993 | Nakai et al. | 123/518 |
| 5,261,379 | 11/1993 | Lipinski et al. | 123/520 |
| 5,265,577 | 11/1993 | Denz et al. | 123/520 |
| 5,267,547 | 12/1993 | Chikamatsu et al. | 123/518 |
| 5,269,277 | 12/1993 | Kuroda et al. | 123/518 |
| 5,273,020 | 12/1993 | Hayami | 123/520 |
| 5,275,144 | 1/1994 | Gross | 123/520 |
| 5,295,472 | 3/1994 | Otsuka | 123/520 |
| 5,297,527 | 3/1994 | Suzuki et al. | 123/520 |
| 5,297,529 | 3/1994 | Cook et al. | 123/520 |
| 5,299,545 | 4/1994 | Kuroda et al. | 123/520 |
| 5,315,980 | 5/1994 | Otsuka et al. | 123/520 |
| 5,317,909 | 6/1994 | Yamada et al. | 123/520 X |
| 5,327,873 | 7/1994 | Ohuchi et al. | 123/520 |
| 5,333,589 | 8/1994 | Otsuka | 123/520 |
| 5,333,590 | 8/1994 | Thomson | 123/520 |
| 5,349,935 | 9/1994 | Mezger | 123/520 |
| 5,369,984 | 12/1994 | Rogers et al. | 73/49.2 |
| 5,425,266 | 6/1995 | Fournier | 73/49.2 |

OTHER PUBLICATIONS

Exhibit B discloses a photograph of the fuel tank assembly leak tester disclosed in Exhibit A.

Exhibit C discloses another "all manual" fuel tank assembly leak tester made by or for K–Line Industries, the assignee of the present application which tester was manufactured for Volkswagen Company over one year ago to pressure test fuel tank assemblies for fuel leaks. The lead components are listed on the disclosure.

Exhibit D discloses a photograph of the fuel tank assembly leak tester disclosed in Exhibit C.

Exhibit E is a publication entitled "OBD–II Evaporative System Monitor", published by B. Schwager of Ford Motor Company, dated Sep. 29, 1993, which discloses a method of testing a fuel tank including pressurizing the fuel tank system to 10 inches water with nitrogen, which is a non–combustible gas.

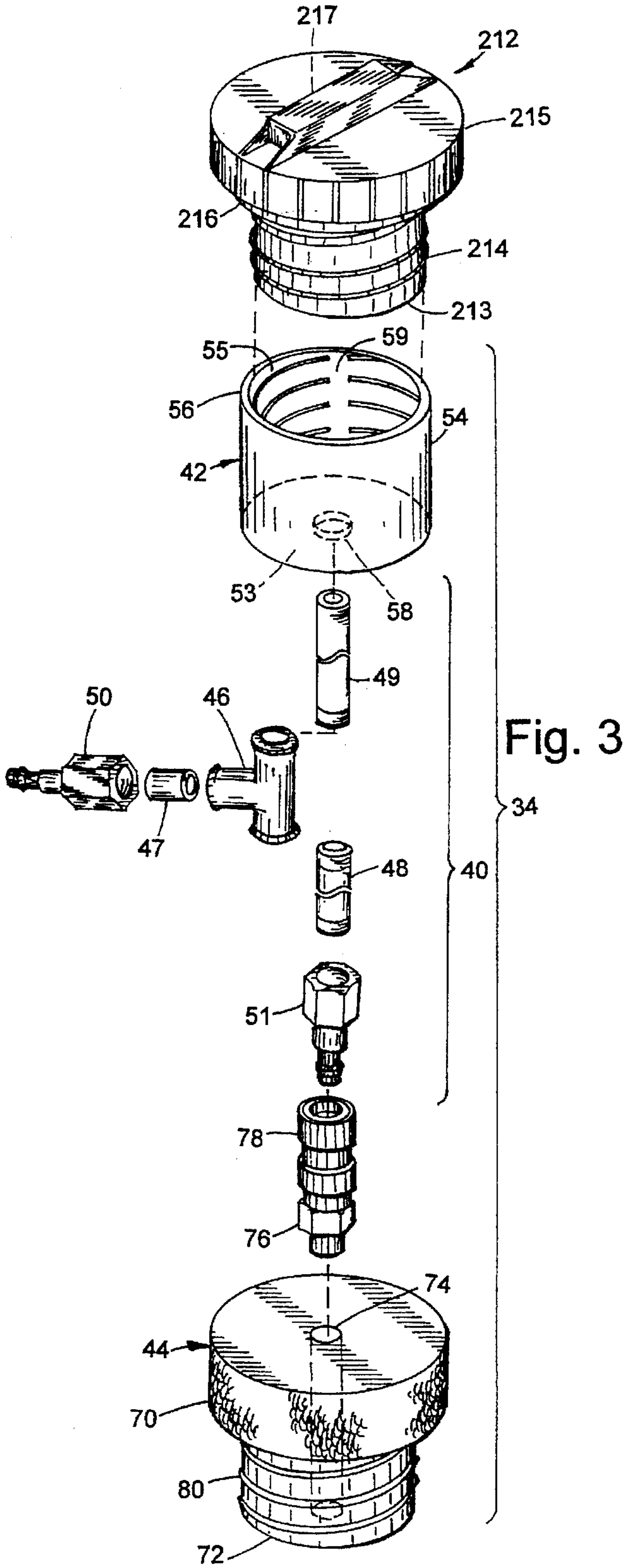
Fig. 3
Fig. 5
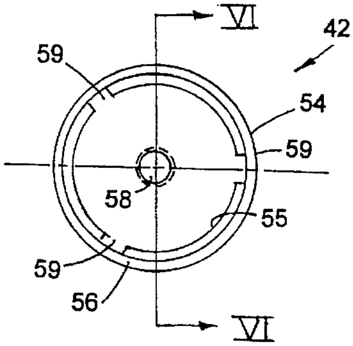
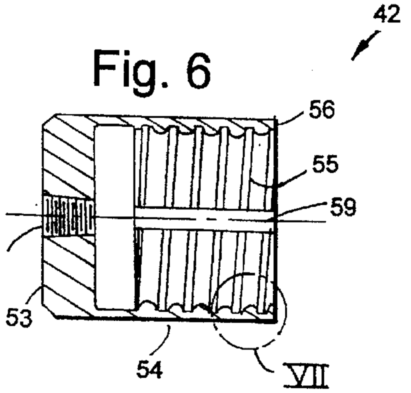
Fig. 6
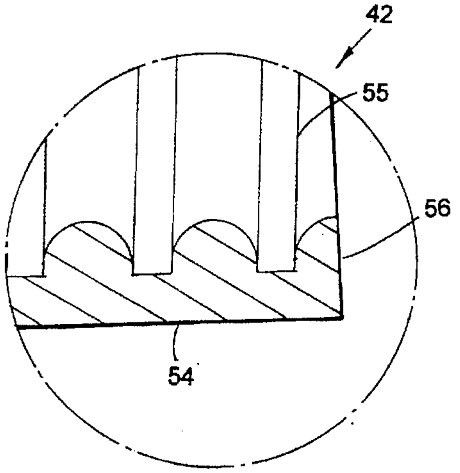
Fig. 7

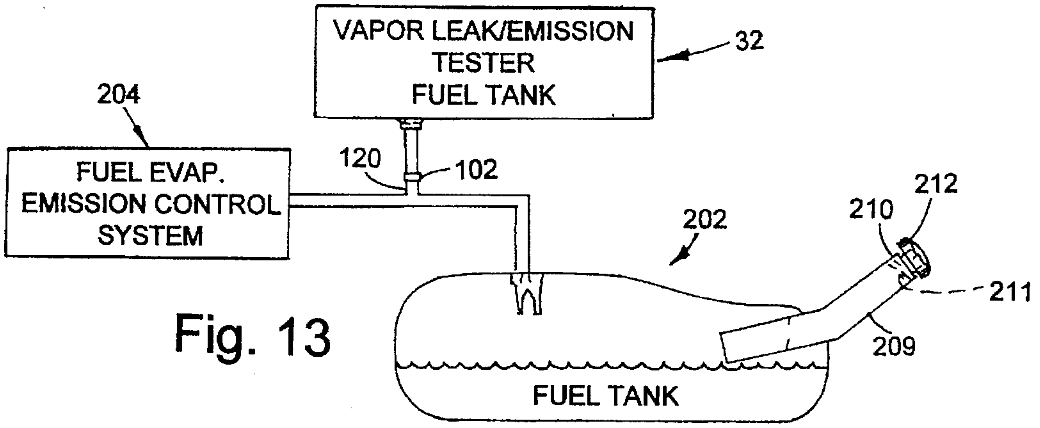
Fig. 13
Fig. 14
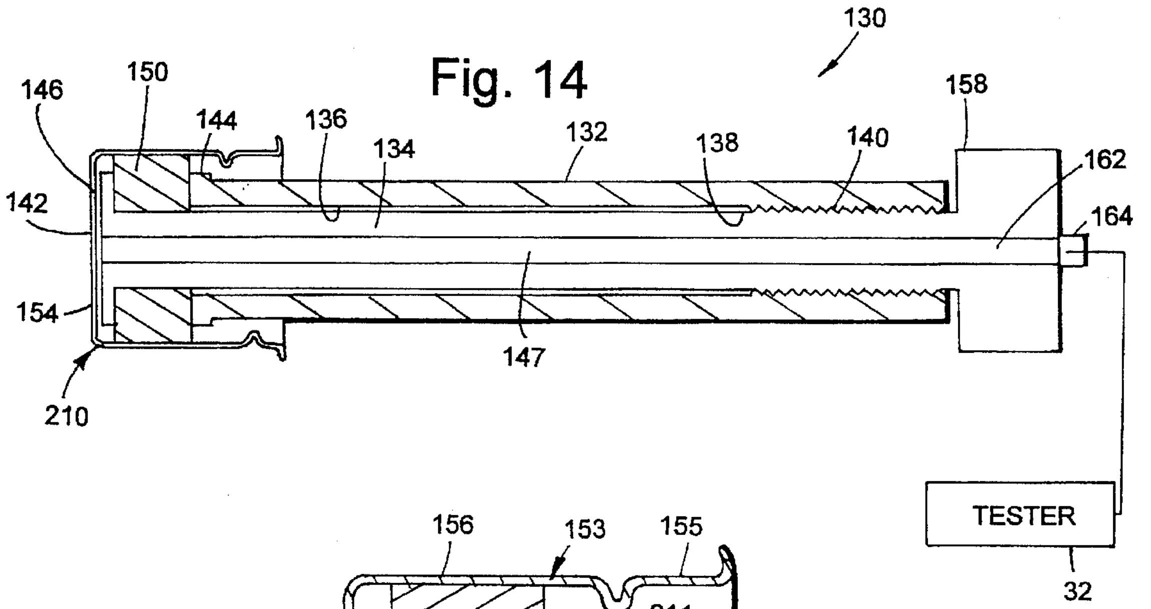
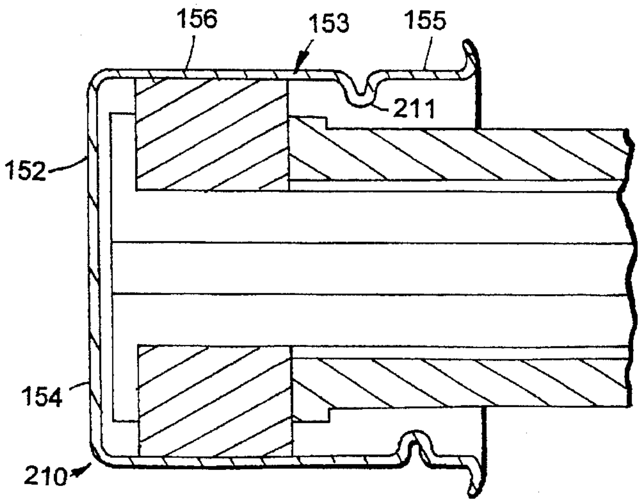
Fig. 15

EVAPORATIVE EMISSIONS TEST APPARATUS AND METHOD

CROSS REFERENCE

This is a continuation-in-part of U.S. application Ser. No. 08/218,350, filed Mar. 28, 1994, now U.S. Pat. No. 5,507,176, entitled EVAPORATIVE EMISSIONS TEST APPARATUS AND METHOD.

BACKGROUND OF THE INVENTION

The present invention concerns emissions test apparatus, and more particularly concerns an apparatus adapted to pressure test a vehicle fuel holding system including related components for vapor emitting leaks leading to hydrocarbon emissions in the form of evaporated fuel.

Fuel tank assemblies of vehicles in service periodically experience warming, causing the atmosphere in the vehicle fuel holding system to expand. If left uncontrolled, the expanding atmosphere discharges a considerable amount of environmentally harmful hydrocarbon vapors (i.e. gasoline or fuel vapors) into the environment. In an effort to control the discharge of these hydrocarbon vapors, modern vehicles now include fuel caps that sealingly close a fill tube access port to the vehicle fuel tank assembly. Further, the modern vehicles have an evaporative emissions control system which feeds vapors from the fuel tank assembly to the vehicle engine for burning or which otherwise contains the vapors or treats the vapors to reduce their harmful qualities before the vapors are released to the atmosphere.

These systems are generally effective; however, it is desirable to test the integrity of the fuel tank assembly and evaporative emissions control system to assure that there are not any leaks that would allow vapors to bypass the system and be discharged into the environment. Further, government regulations may soon require testing of vehicles that have been in service for a period of time, since such undesirable leaks can develop or worsen during the service life of a vehicle. Unfortunately, the leaks, if present, typically occur at component joints under the vehicle where they are most difficult to find or see, especially if the vehicle has been in service and has a dirty underbody. Still further, the leaks most commonly occur above the fuel level such as on the top side of the fuel tank where the evaporative emissions control system or fuel delivery system attaches to the tank, which top side is hidden from view and difficult or impossible to inspect even on a vehicle hoist.

In response to the above, at least one domestic automotive company has proposed an "all manual" evaporative emissions test method for vehicles which would include providing a special test port attached to the existing evaporative emissions control system or, alternatively, include providing a special test port in a specially adapted "replacement" fuel cap used only during testing. An "all manual" emissions tester would be connected to the special test port, and a pressure source such as an air compressor would be connected to the tester to pressurize the atmosphere of the vehicle fuel tank assembly and the evaporative emissions control system. The "all manual" proposed emissions tester would further include a pressure regulator to control the pressurization of the atmosphere, a shutoff valve to prevent back-flow of the pressurized atmosphere, a pressure gauge for sensing the pressure of the atmosphere over time, and a flexible hose with a connector for connecting to the special test port. The "all manual" proposed test would be controlled manually, with an operator controlling the initial pressurization and stabilization of the atmosphere, and then manually determining the change in pressure over a predetermined time period.

However, the "all manual" proposed tester and test method would not be entirely satisfactory since the manual control over the test and tester could potentially lead to inaccurate and misleading results. This is because manually operated tests depend to a large degree on the precision, accuracy and attention of the operator running the test. Further, particularly in vehicles that are borderline in regard to passing or failing the test, the operator may be biased to misread the tester so that the operator receives additional work (even though the repair is not required) or, alternatively, so that the operator does not need to do any work (even though the repair should be done), depending upon the preference of the operator. Still further, it is undesirable to require special test ports on the vehicle since this adds to the cost of the vehicle without giving any visible benefit to the consumer. Additionally, it is desirable to test the vehicle fuel holding system as a complete unit rather than individual components one at a time, and thus it is frequently undesirable to remove the existing fuel cap from the vehicle during testing.

Prior art also includes at least two types of other "all manual" testers for testing for fuel leaks in fuel tank assemblies, as disclosed in the disclosure statements submitted with this application. However, these two types of testers are manually operated, and thus depend on the precision, accuracy, and attention of the operator, which results in the problems discussed above. Also, these two testers are for pressure-testing a fuel tank assembly, and not for testing an entire fuel system including an evaporative emissions control system connected to the fuel tank assembly.

It is desirable that any test apparatus for testing for gas vapor leaks be portable and adapted for use in a wide range of circumstances, such as in service stations having different levels of sophistication and expertise. However, as test apparatus are made more sensitive, their reliability and accuracy does not necessarily improve. For example, test apparatus of the type disclosed in this application requires a source of clean pressurized gas. However, many sources of compressed gas are relatively unclean, such as compressed air from air compressors at many service stations. Unclean compressed gas can quickly foul and destroy the accuracy and reliability of a test apparatus for testing leaks. Bottled compressed gas is usually relatively clean, however the bottles of compressed gas tend to provide an unstable, uncertain gas pressure, particularly as the bottle runs low and the internal pressure of compressed gas in the bottle drops off. This adversely affects the accuracy and reliability of the test apparatus. Regulators can be used on the bottles of compressed gas in an effort to provide a continuous gas pressure and continuous stable flow of gas from the bottles of compressed gas, however the gas pressure is only roughly controlled and is not as well controlled as desired. Further, the regulators are reactive, such that the gas flow experiences surges and non-uniform flow as a shut-off valve on the bottles of compressed gas are opened. This can adversely affect the accuracy of the test apparatus and further can damage highly sensitive sensors in the test apparatus. Additionally, the surge control and the pressure control must be accomplished at relatively low gas pressures and with relatively inexpensive components so that the emissions test apparatus can be purchased by local service stations at remote and rural locations without large capital expenditures.

Thus, a test apparatus which is accurate and which operates substantially independent of an operator during the actual test sequence is desired. Further, a test apparatus is desired which minimizes the overall cost of any test apparatus and method developed including minimizing any special parts required to be permanently or temporarily assembled to the vehicle.

SUMMARY OF THE INVENTION

The present invention includes an emissions test apparatus for testing for vapor emitting leaks in a fuel holding system in a vehicle. The apparatus includes a pressurizing system having a first pressure regulator configured for connection to a source of pressurized gas for regulating a maximum first pressure in the apparatus downstream of the first pressure regulator, and a first surge protector connected to the first pressure regulator for controlling first surges from the first pressure regulator. The pressurizing system further includes an adjustable second pressure regulator operably connected to the first surge protector for adjustably regulating a second pressure of pressurized gas for operating the apparatus, the second pressure regulator including an adjustment knob positioned in a readily accessible position on the apparatus so that the pressure downstream of the second pressure regulator can be adjusted for changes in ambient atmospheric pressure. A line extends from the second pressure regulator for operably connecting the second pressure regulator to the fuel holding system. The apparatus also includes a pressure-monitoring system having a pressure sensor operably connected to the line for measuring the pressure of the atmosphere in the fuel holding system, a timer for indicating passage of a predetermined amount of time, and a switch for actuating said timer when the second pressure is reached in the atmosphere in the fuel holding system. The pressure-monitoring system also includes an indicator operably connected to the pressure sensor, the timer and the switch, the indicator being configured to indicate that a change in the pressure of the atmosphere over the predetermined time is acceptable or unacceptable.

The present invention further includes an emissions test apparatus for testing for vapor emitting leaks in a fuel holding system in a vehicle, including a cabinet and a system-pressurizing and pressure-monitoring pneumatic circuit mounted to the cabinet. The pneumatic circuit includes a connector for connection to a source of pressurized gas, an adjustable pressure regulator operably connected to the connector and mounted in the cabinet for adjustably regulating an operating pressure of the apparatus downstream of the adjustable pressure regulator. The pressure regulator includes an adjustment knob positioned in a readily accessible position on the cabinet so that the pressure downstream of the pressure regulator can be adjusted to compensate for changes in ambient atmospheric pressure. The pneumatic circuit further includes a surge protector operably connected to the adjustable pressure regulator for controlling surges in the operating pressure in the circuit, and an indicator mechanism operably connected to the circuit and configured to sealingly engage the fuel holding system for indicating that a timed change in the pressure of the atmosphere over said predetermined time is acceptable or unacceptable. The indicator mechanism also includes a pressure sensor operably connected to the surge protector and further includes a line for communicating the pressurized gas from the circuit to the fuel holding system so that the pressure sensor continuously monitors the pressure of the atmosphere in the fuel holding system over time.

The present invention also includes a method of testing for vapor emitting leaks in a fuel holding system in a vehicle. The method includes providing a portable evaporative emissions test apparatus including a first pressure regulator configured for connection to a source of pressurized gas, a first surge protector operably connected to the first pressure regulator; an adjustable second pressure regulator operably connected to the first surge protector, the second pressure regulator including an adjustment knob positioned in a readily accessible position on the apparatus, a pressure sensor operably connected to said fuel holding system and to the second pressure regulator, and an indicator mechanism operably connected to said pressure sensor. The method further includes adjusting the second pressure regulator to compensate for changes in ambient atmospheric pressure, pressurizing the fuel holding system with a surge-controlled input of pressurized gas, measuring the change in pressure in the fuel holding system over a predetermined period of time, and indicating that a problem exists if the pressure change is greater than the acceptable change.

These and other features and advantages of the present invention will be further understood and appreciated by those skilled in the art by reference to the following specification, claims and appended drawings.

BRIEF DESCRIPTION OF THE DRAWINGS

FIG. 3 is an exploded perspective view of the adapter shown in FIG. 2 including the fuel cap;

FIG. 5 is an end view of the first end member of the adapter shown in FIG. 3;

FIG. 6 is a cross-sectional view taken along the plane VI—VI in FIG. 5;

FIG. 7 is an enlarged view of the circled area VII in FIG. 6;

FIG. 13 is an alternate embodiment of the present invention showing the tester connected to the evaporative emissions system portion of the vehicle fuel holding system;

FIG. 14 is another alternate embodiment of an adapter for sealingly engaging the access port defined by the fuel fill tube;

FIG. 15 is an enlarged view of an end of the adapter shown in FIG. 14; and

DETAILED DESCRIPTION OF THE PREFERRED EMBODIMENT

Figure 1:
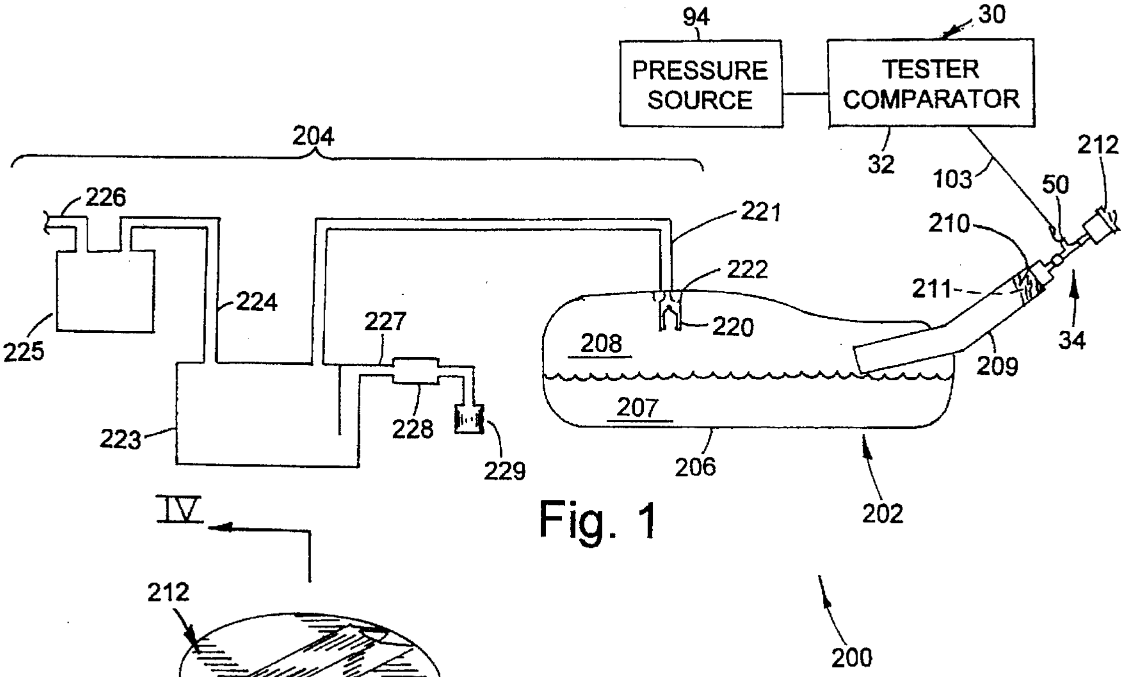
FIG. 1 is a schematic view of an evaporative emissions test apparatus embodying the present invention connected to a vehicle fuel holding system, the fuel holding system including a fuel tank assembly and an evaporative emissions control apparatus, the apparatus including a tester and an adapter connecting the tester to the vehicle fuel holding system through an existing access port on the fuel tank assembly.

An evaporative emissions test apparatus 30 (FIG. 1) embodying the present invention includes a tester 32 adapted to pressure test a vehicle fuel holding system 200 for vapor emitting leaks, and an adapter 34 configured to releasably engage fuel holding system 200. More specifically, the vehicle fuel holding system 200 includes a fuel tank assembly 202 defining an access port 210 allowing fuel to be added to fuel tank assembly 202, and further includes a fuel cap 212 configured to sealingly engage access port 210 to prevent loss of fuel vapors including hydrocarbons (hereinafter called evaporative emissions) through access port 210. An evaporative emissions control system 204 is connected to fuel tank assembly 202 to control the evaporative emissions, such as by feeding the evaporative emissions to the vehicle engine (not shown) for burning. Adapter 34 (FIG. 1) is configured to sealingly engage the access port 210 on the fuel holding system 200 and also is configured to sealingly receive a fuel cap 212 so that the fuel holding system 200 can be quickly and efficiently tested as a complete unit, even on a fully assembled vehicle already in service.

A typical vehicle fuel holding system 200 (FIG. 1) includes a fuel tank assembly 202 and an evaporative emissions control system 204 operably connected to the fuel tank assembly 202. The fuel tank assembly 202 includes a fuel tank 206 shown as having fuel 207 therein, and an atmosphere 208 including fuel vapors containing hydrocarbon vapors considered harmful to the environment. A fuel tank fill tube 209 is sealingly attached to fuel tank 206. Fuel fill tube 209 defines an access port 210 at the side of a vehicle, and is adapted with threads or grooves 211 to mateably receive fuel cap 212 (FIG. 13).

Fuel cap 212 includes a threaded or ridged protruding end 213 (see FIGS. 3 and 13) having external threads or ridges 214 configured to mateably engage fill tube threads or ridges 211, and an aesthetic cover 215 mateably joined to threaded or ridged protruding end 213. Aesthetic cover 215 is configured to rotatingly slip with a predetermined torque on threaded or ridged protruding end 213 so that fuel cap 212 cannot be over-tightened. Threaded or ridged protruding end 213 includes a seal 216 for sealingly engaging access port 210, and further includes a relief valve 217 configured to release pressure within fuel holding system 200 if the fuel holding system 200 is over-pressurized.

The evaporative emissions control system 204 (FIG. 1) includes a valve 220 located at fuel tank 210, and further includes an atmosphere communicating line 221 extending from and operably connected to fuel tank 206 at connection 222. Notably, the valve 220 at tank connection 222 prevents liquid fuel from entering atmosphere containing line 221. The line 221 extends from fuel tank 206 to a carbon canister 223. Another atmosphere communicating line 24 extends from carbon canister 223 to a solenoid 225. Solenoid 225 controls flow of the evaporative emissions to the vehicle engine through line 226. A second line 227 extends from carbon canister 223 through an N/O canister vent shutoff solenoid 228 to a purged air filter 229.

Figure 2:
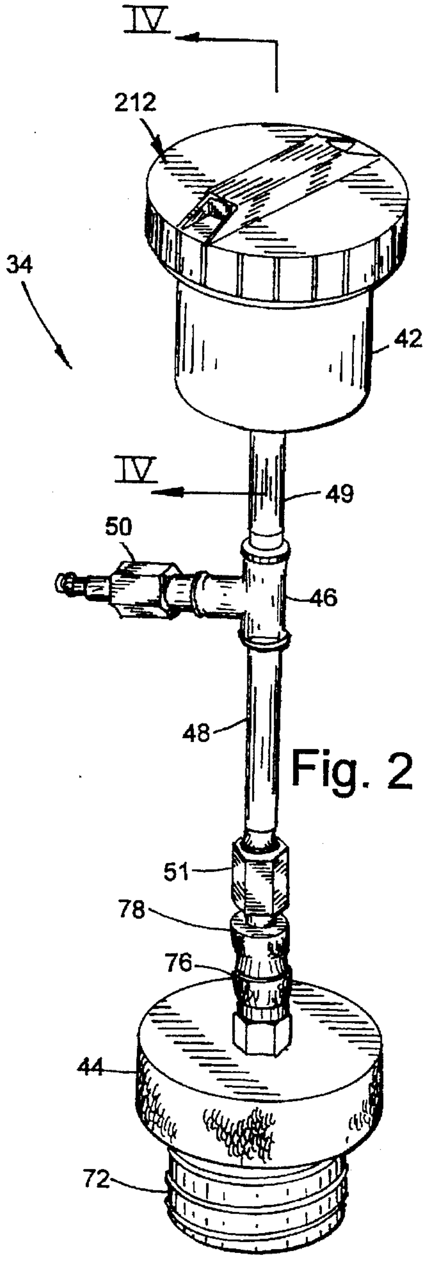
FIG. 2 is an enlarged perspective view of the adapter shown in FIG. 1, including a fuel cap engaged with the adapter.

Adapter 34 (FIG. 1) is particularly configured to permit quick attachment of tester 32 to a vehicle, but without the need for specialized or "extra" parts on the vehicle. Further, adapter 34 advantageously allows testing of the complete fuel holding system 200 of the vehicle including the evaporative emissions control system 204 and the fuel tank assembly 202 (including fuel tank 206, fuel tube 209 and fuel cap 212) in a single test as a complete system. Adapter 34 (FIGS. 2 and 3) includes a body or intermediate member 40 and first and second end members 42 and 44 connected to body 40. More specifically, body 40 includes a T-connector 46 with rigid tube sections 47, 48 and 49 extending from T-connector 46. A quick disconnect 50 is connected to the end of tube section 47 for releasably connecting to tester 32. Another quick disconnect 51 is connected to tube section 48, and it is contemplated that yet another quick disconnect could be connected to tube section 49 if desired, although no such quick disconnect is shown.

Figure 4:
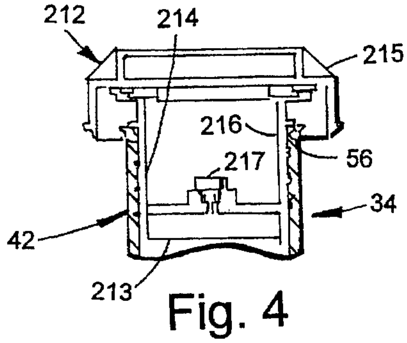
FIG. 4 is a cross-sectional view taken along the IV—IV in FIG. 2.

End member 42 (FIGS. 3–6) is generally cup-shaped and includes an end section 53 and a cylindrically-shaped sidewall 54. Internal threads 55 are located on the inside of sidewall 54, threads 55 defining retention surfaces comparable to the threads on the inside of access port 210 and thus being adapted to mateably receive threads 214 of fuel cap 212. The outer end surface 56 on sidewall 54 is substantially flat and adapted for sealing against seal 216 on fuel cap 212 (FIG. 4). A bore 58 extends through end section 53. Bore 58 is threaded and mateably receives and engages tube section 49.

As shown in FIG. 4, end member 42 is configured to matingly receive fuel cap 212 with fuel cap threads 214 engaging end member threads 211 so that fuel cap seal 216 seals against the end surface 56 on end member 42. The passageway within body 40 places fuel cap relief valve 217 in fluid communication with access port 210, thus allowing the fuel cap 212 to be tested with the vehicle fuel holding system 200 during the evaporative emissions test.

End member 42 (FIGS. 5–6) includes three longitudinally extending slots 59 that cut transversely across threads 55. Slots 59 are located 120° apart around the inside surface of sidewall 54. Slots 59 are constructed to receive mating prongs on a fuel fill cap (not shown) now being developed. The new fuel fill cap would telescope into end member 42 with the prongs sliding along slots 59. Once inserted, the new fuel cap would be rotated about 90° such that the prongs would operably engage the threads 55. Thus, end member 42 is adapted to receive either of two different types of fuel fill caps (212).

It is also contemplated that a quick disconnect could be located on end member 42 for releasably engaging a corresponding quick disconnect on tube section 49. This would facilitate selective replacement of end member 42. Thus, an end member configured to engage a different style fuel fill cap could be quickly and easily attached to tube section 49. Thus, a plurality of different end members (42) could be provided as needed to cover newly designed fuel fill caps.

Figure 9:
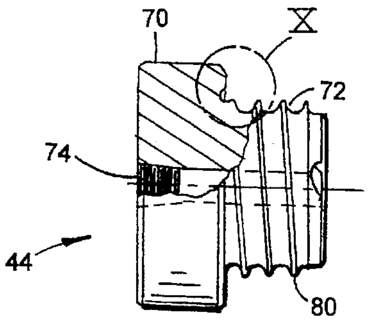
FIG. 9 is a cross-sectional view taken along the plane IX—IX in FIG. 8.
Figure 8:
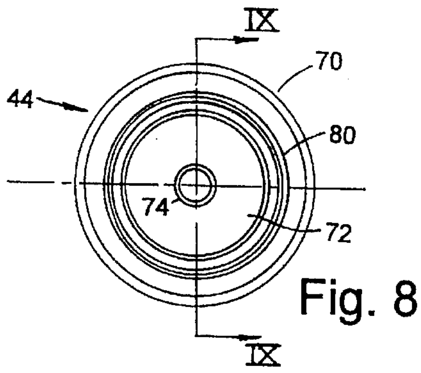
FIG. 8 is an end view of the second end member shown in FIG. 3.

End member 44 (FIGS. 8–10) includes a large diameter end 70 and a small diameter end 72. A bore 74 extends longitudinally through end member 44 for engaging a tube nipple 76 and quick disconnect 78. Quick disconnect 78 engages quick disconnect 51 on adapter body 40. This allows a particular end member 44 to be selected from a plurality of such end members, each of the plurality of end members being configured to fit various car/vehicle access port configurations. For example, one known style access port configuration on older U.S. built vehicles includes a 90° twist and lock configuration as opposed to fuel cap threads 214.

Figure 10:
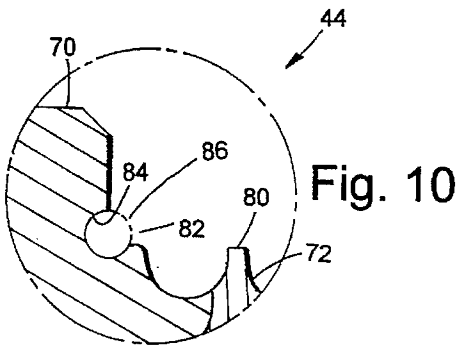
FIG. 10 is an enlarged view of the circled area X in FIG. 9.

Small diameter end 72 includes external threads 80 configured to engage access port 210 in the same manner as fuel cap 212 engages access port 210. Large diameter end 70 and small diameter end 72 form an exterior corner 82 (FIG. 10). A ring-shaped recess 84 is located at corner 82 for receiving an O-ring 86 for sealing against the end of access port 210 in a manner like seal 216 of fuel cap 212. The outer diameter of large diameter end 70 is knurled or otherwise treated to improve gripping so that end member 44 can be easily grasped and screwed into access port 210.

Figure 11:
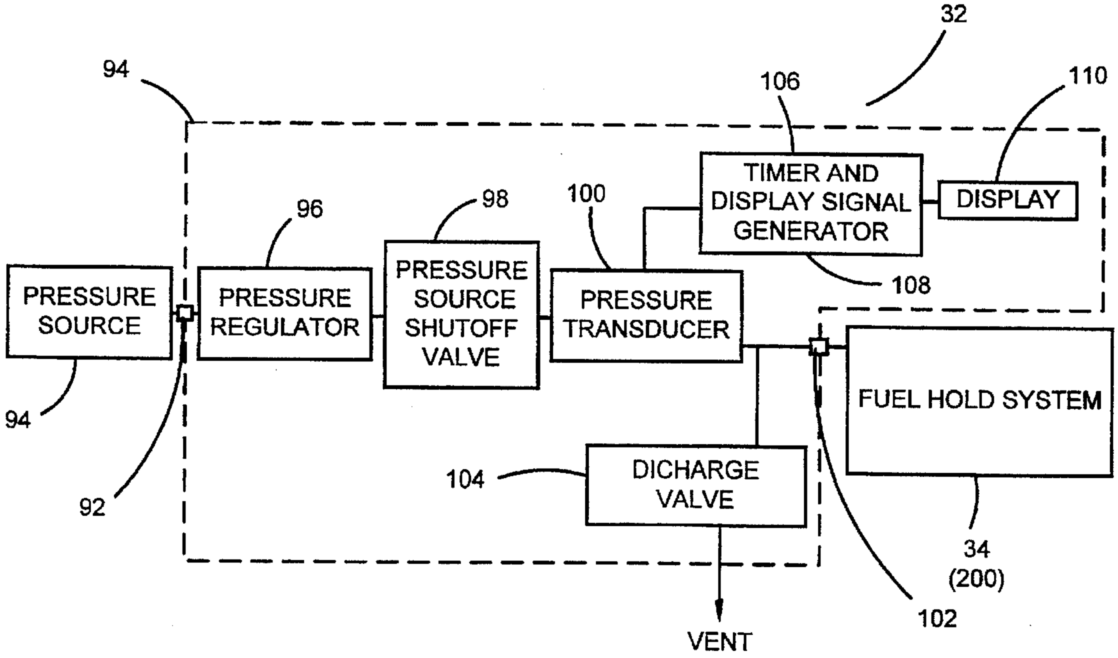
FIG. 11 is a schematic view of the tester shown in FIG. 1.

Tester 32 (FIG. 11) includes a portable housing 90 represented by the dashed lines in FIG. 11. A connector 92 is attached to tester 32 and extends from housing 90 for connecting to an external pressure source 94. It is contemplated that external pressure source 94 can be an air compressor, bottled gas such as argon, or another pressure source. Notably, pressure source 94 could be included within housing 90, such as by including an air compressor within housing 90. A pressure regulator 96 is connected to connector 92 for setting the desired pressure of the system. It is contemplated that the desired pressure will be in the range of 15 to 40 inches of water.

A shutoff valve 98 is connected to pressure regulator 96, shutoff valve 98 allowing controlled addition of pressure through tester 32 and further preventing back-flow of atmosphere from the fuel holding system 200 through tester 32 during operation of the test. Also, a pressure sensor 100 chosen to accurately sense a pressure drop of about 6.0 inches of water or less is operably connected adjacent shutoff valve 98, and a connector 102 is connected to pressure sensor 100 for connecting to the vehicle fuel holding system 200 to be tested. For example, connector 102 can be connected to a flexible hose having a quick disconnect adapted to engage quick disconnect 50 on adapter 34. A discharge valve 104 is connected to the tester 200 such as between pressure sensor 100 and connector 102. A timer 106 and display signal generator 108 are operably connected to pressure sensor 100, and a display 110 is connected to display signal generator 108.

Figure 12:
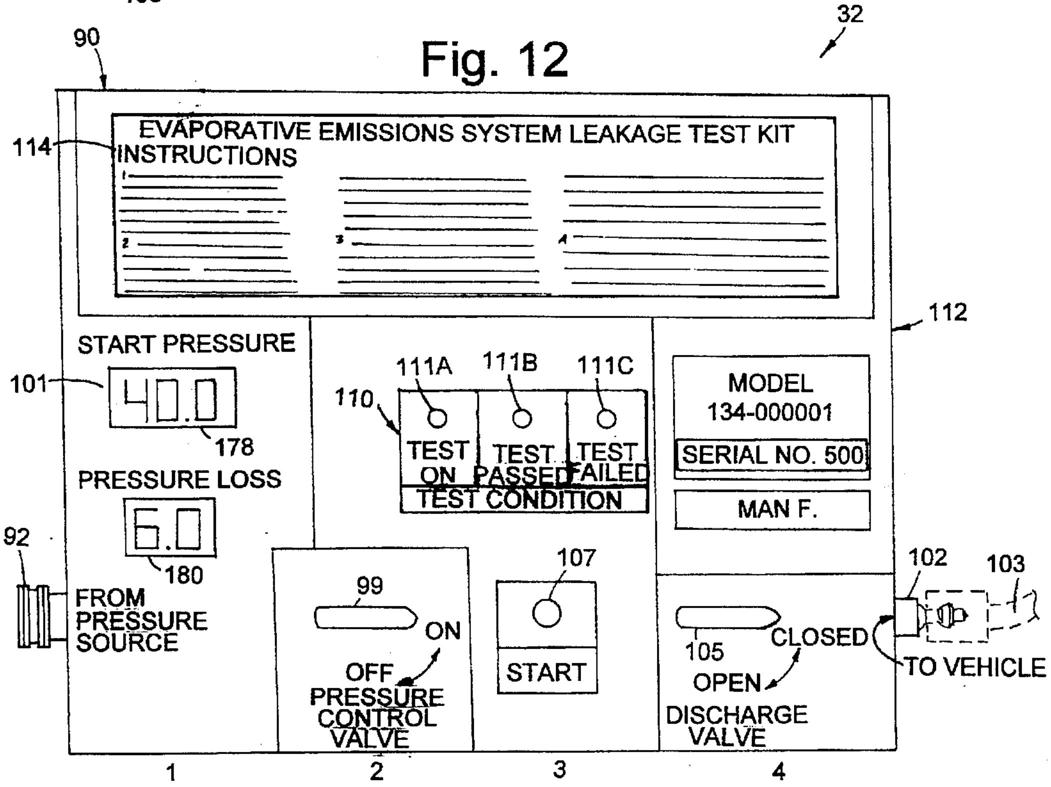
FIG. 12 is a front view of a control panel for the tester shown in FIG. XI.

An exemplary control panel 112 for tester 32 is shown in FIG. 12 and includes a connector 92, and a non-adjustable pressure regulator (96). Further, a knob 99 allows control of the shutoff valve (98), and a second knob 105 allows control of the discharge valve (104). An LCD display 101 is connected to the pressure sensor (100) to provide a readout of the pressure within fuel holding system 200. A start button 107 is operably connected to the timer (106), button 107 including a manually actuatable push-button-type switch for actuating the timer (106). Display 110 is shown as including a "test on" light 111A, a "test pass" light 111B, and a "test fail" light 111C. Also shown is connector 102 for connecting to a hose 103 connected to adapter connector 50. The control panel 112 further includes instructions 114 giving details about the operation of tester 32 as may be required. Notably, it is contemplated that housing 90 will include storage areas (not shown) such as for receiving and storing adapter 34 and several of the plurality of end members 42 or 44 as may be required.

Figure 11A:
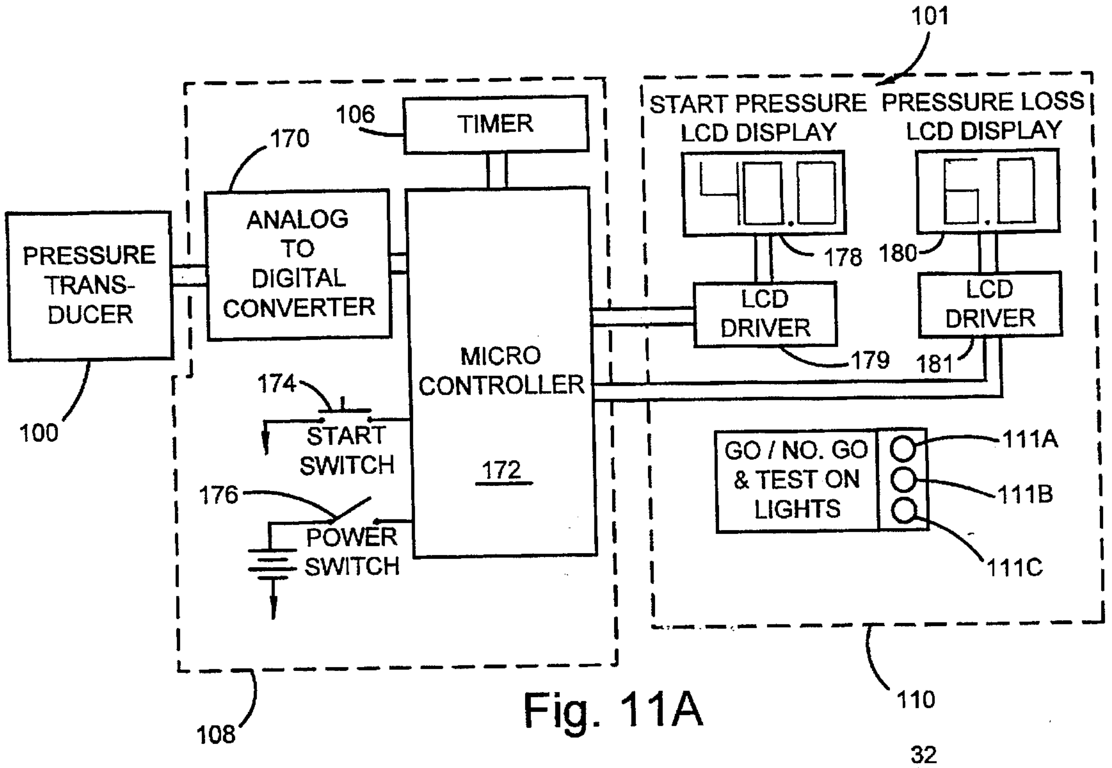
FIG. 11A is a schematic view of the electrical control and display circuit of the tester shown in FIG. 1.

An electrical schematic of tester 32 including pressure transducer 100, timer 106, display signal generator 108, and display 110 is shown in FIG. 11A. Display signal generator 108 includes an analog-to-digital converter 170 for converting analog signals from pressure transducer 100 into digital signals for a micro-controller 172. AD converter 170 is operably connected to pressure transducer 100 for receiving signals indicating the atmospheric pressure in the fuel system, and is further operably connected to micro-controller 172 for outputting a converted digital signal to LCD driver 179 and/or 181. A start switch 174 and power switch 176 are operably connected to micro-controller 172 along with timer 106. Display 110 is also operably connected to micro-controller 172 and includes an LCD display 178 (and display driver 179) for indicating the starting atmospheric pressure, an LCD display 180 (and display driver 181) for indicating the atmospheric pressure loss, and the "test on"/"go"/"no-go" lights 111A, 111B, and 111C.

With power switch 176 on, micro-controller 172 is energized and signals are received from pressure transducer 100 through an analog to digital converter 170. Micro-controller 172, in response to the signal from the pressure transducer signal, sends a corresponding signal to display driver 179 causing pressure readings to be displayed on LCD display 178. When start switch 174 is closed, timer 106 is actuated and signals are transmitted from micro-controller 172 to display driver 181 causing pressure loss readings to be displayed on LCD display 180. As timer 106 completes its timing function and indicates completion of a predetermined time period, the pressure loss reading on display 180 is frozen. Also, the appropriate "go"/"no-go" display light 111B or 111C, respectively, is lighted. Notably, the present invention is contemplated to include a number of different electrical arrangements and configurations, and the above disclosed circuitry is not intended to be unnecessarily limiting to the scope of the inventive concepts claimed herein.

Test apparatus 30 is operated in the following manner. The fuel holding system 200 is prepared as required, such as by reducing the amount of fuel held within fuel holding system 200, and tester 32 is prepared as required, such as by setting pressure regulator 96 to the appropriate desired determined pressure. Pressure source 94 is then connected to tester 32 and tester 32 is connected to the fuel holding system 200 such as by use of adapter 34 as previously described. As shutoff valve 98 is opened, pressure source 94 communicates a volume of air or gas through tester 32 into the fuel holding system 200. This pressurizes the atmosphere within fuel holding system 200 to the predetermined pressure. Once the predetermined pressure is stably established, shutoff valve 98 is closed and timer 106 is actuated. Notably, tester 32 can be configured so that timer 106 is automatically actuated as shutoff valve 98 is closed, or it can be configured so that timer 106 must be manually tripped. After expiration of a predetermined amount of time, timer 106 actuates display signal generator 108 which initially determines through use of pressure sensor 100 whether the continuing pressure of the atmosphere within fuel holding system 200 is at or above an acceptable second predetermined pressure. Notably, the second predetermined pressure can be a preset value, a value stored in memory or a value set by adjustment based on the particular vehicle fuel holding system being tested. Display signal generator 108 then displays a signal through display 110 showing whether the fuel holding system 200 has passed the test. Notably, tester 32 operates automatically to display a pass/fail signal as timer 106 expires. This causes display signal generator 108 to automatically display the test result on display 110. It is contemplated that this will reduce or eliminate the tendency to inaccurately read the results of the test.

Presuming for a moment that the fuel holding system 200 has failed the test, the system 200 can be left in a pressurized state so that a fuel vapor leak detector (not shown) can be used to determine where the leak(s) causing the failure is located. Once the test is complete and the pressure within vehicle fuel holding system 200 is no longer needed, discharge valve 104 is placed in the open position to relieve the pressure after the pressure source shutoff valve is placed in the off position.

It is contemplated that tester 32 can be connected to other places on a vehicle fuel holding system 200 other than only through the access port 210. As shown in FIG. 13, connector 102 of tester 32 is connected to a special test port 120 located substantially anywhere on the evaporative emissions control system 204 of fuel holding system 200. Further, it is noted that tester 32 could be connected to evaporative emissions control system 204 such as by disconnecting one of lines 221, 224, 226, 227 and 209, connecting to the disconnected line, and plugging any open connections resulting from the disconnection. It is also contemplated that modifications of adapter 34 can be made. In another embodiment shown in FIGS. 14 and 15, an adapter 130 includes an elongated tubular first member 132 and an elongated tubular second member 134 mateably telescopingly received in first member 132. Elongated first member 132 includes a bore 136 for slidably receiving second elongated member 134, and further includes internal threads 138 at an outer end for mateably engaging external threads 140 on second elongated member 134. A tip 142 on the access-port-engaging end of second elongated member 134 extends beyond a tip 144 on the end of first elongated member 132. Tip 142 includes a compression washer 146 proximate its end which is held on tip 142 by a snap-lock ring or similar means. A resilient deformable but substantially incompressible grommet 150 made of rubber or elastomeric material is positioned between compression washer 146 and the end of tip 144. Tip 142, tip 144, washer 146, and grommet 150 are insertable into access port 210 as discussed below. A handle 158 is located on second elongated member 134 opposite tip 142. A bore 147 extends longitudinally through tubular second member 134.

An enlarged view of the end of adapter 130 is shown in FIG. 14 as being positioned in an exemplary fuel tank access port 210. Access port 210 is cup-shaped and includes a wall forming member 152 having a hole 154 therein, and an internally threaded side wall 153 having threads 211. As is well known in the art, hole 154 has a standardized size for receiving a gasoline/fuel dispensing nozzle of particular size. For example, gasoline dispenser nozzles for dispensing leaded gasoline will not fit into nozzles for dispensing unleaded gasoline. Sidewall 153 includes a threaded section 155 and a cylindrically-shaped section 156. Tip 142 is shaped so that it can be extended into access port 210 with grommet 150 extending to a position adjacent cylindrically-shaped section 156. As second elongated member 134 is rotated by handle 158, it forces second elongated member 134 in a longitudinal direction on first elongated member 132. This causes grommet 150 to be compressed between compression washer 146 on second member 134 and the end of tip 144 on first elongated member 132. As shown in FIG. 15, this compression results in grommet 150 bulging and sealingly engaging the material forming cylindrically-shaped section 156. Thus, a seal is formed. Notably, handle 158 includes a bore 162 that connects to bore 147, and further includes a connector 164 extended into bore 162. Connector 164 can be connected to tester 32 and thus the pressure-testing of fuel holding system 200 can be conducted in a generally similar manner to that previously described.

Figure 16:
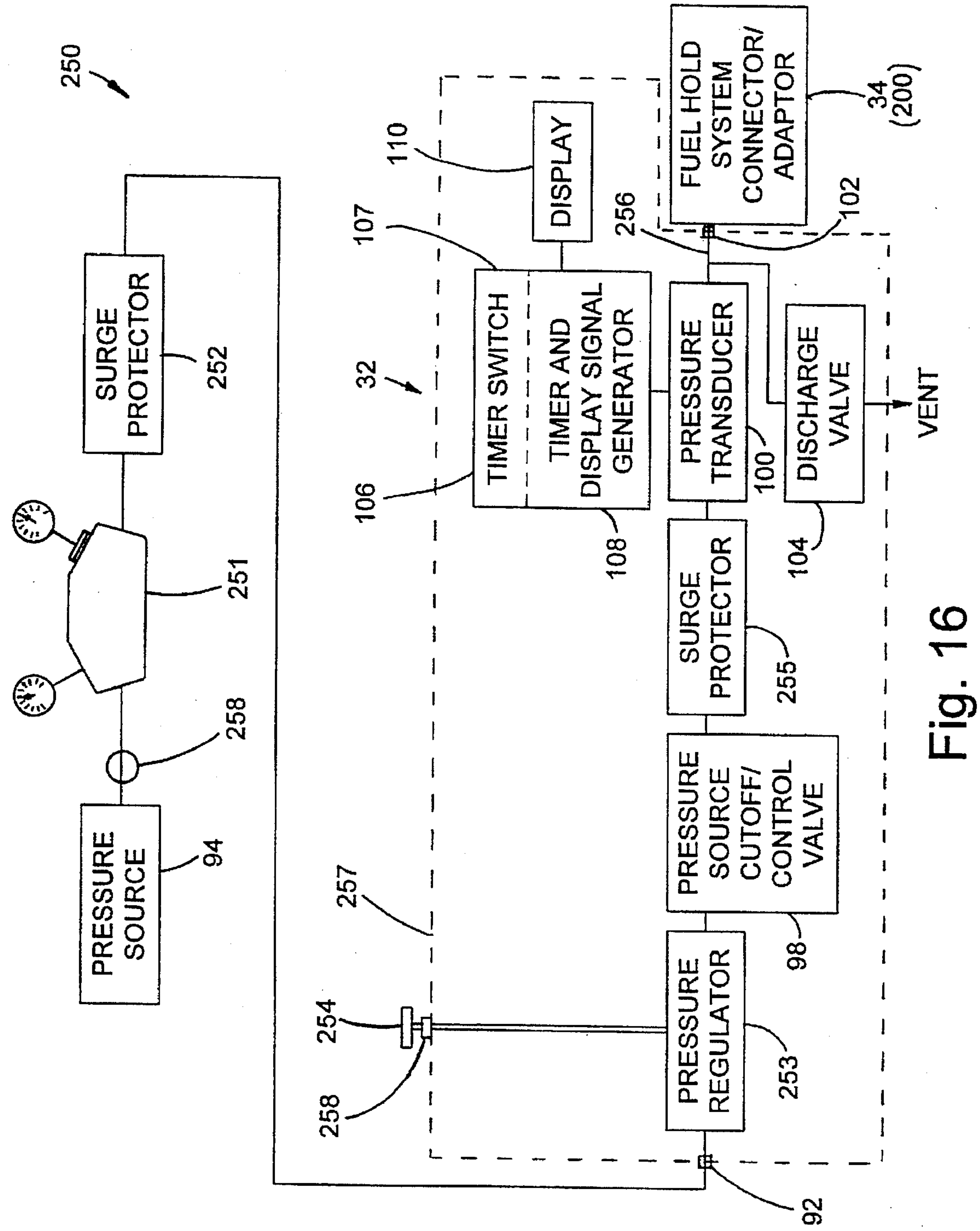
FIG. 16 is another embodiment of a test apparatus embodying the present invention, including two pressure regulators and course and fine surge protectors.

An emissions test apparatus 250 (FIG. 16) includes a pressurizing system having a two-stage pressure regulator 25 1 configured for connection to a source of bottled pressurized gas 94 for regulating a maximum first pressure in the apparatus downstream of the first pressure regulator 251, and a first surge protector 252 connected to the first pressure regulator 251 for controlling surges from the first pressure regulator 251. The pressure regulator 251 is operable from about 0–100 psi, but it is contemplated that it will be preset to about 12 psi. The surge protector 252 may or may not be attached to or located in a cabinet 257 for test apparatus 250. The pressurizing system further includes an adjustable second pressure regulator 253 operably connected to the first surge protector 252 for adjustably regulating a second pressure of pressurized gas for operating the apparatus. The second pressure regulator 253 includes an adjustment knob 254 protruding from cabinet 257 and positioned in a readily accessible position on the apparatus so that the test operating pressure downstream of the second pressure regulator 253 can be adjusted for changes in ambient atmospheric pressure which includes a pressure limiting collar to prevent over-pressurization of the vehicle's fuel system. A second surge protector 255 is located downstream of the adjustable regulator 253 and ahead of the pressure transducer 100. A line 256 extends from the pressure transducer 100 for operably connecting the pressurizing system to the fuel holding system through a connector or adapter, such as adapter 34 (FIG. 1) or connector 102 (FIG. 13).

The apparatus 250 (FIG. 16) also includes a pressure-monitoring system, which includes the pressure sensor/transducer 100 connected to line 256 for measuring the pressure of the atmosphere in the fuel holding system, a timer 106 operably connected to the transducer 100 for indicating passage of a predetermined amount of time, and a switch 107 for actuating said timer 106 when the test-initiation pressure is reached in the atmosphere in the fuel holding system and the pressure has stabilized. The pressure-monitoring system also includes an display signal generator 108 operably connected to the pressure sensor 100, the timer 106 and the switch 107, the display signal generator 108 being configured to indicate that a change in the pressure of the atmosphere over the predetermined time is acceptable or unacceptable.

During testing of the test apparatus 250, it was surprisingly and unexpectedly found that opening the flow valve 258 at the bottle of compressed gas 94 caused a pressure surge that sometimes damaged transducer 100. The surge protector 252 and 255 cooperatively control these surges by allowing the diaphragm in the regulator 251 to react and adjust without the transducer 100 seeing a pressure surge that could damage the transducer 100. Specifically, regulator 251 controls gas pressure to a range of about 10–12 psi. The first surge protector 252 prevents large fluctuations in the pressure within apparatus 250 to prevent damage generally to the components of test apparatus 250. The second surge protector 255 prevents small amplitude surges and is specifically included proximate and upstream of transducer 100 to prevent damage to the transducer 100. Notably, transducer 100 is quite sensitive to surges in pressure and may be damaged by surges above 1 psi that occur in a time span of less than portions of a second. It is contemplated that a variety of different surge protecting products are within the scope of the present invention and can be successfully used for surge protectors 252 and 255, and that a variety of different regulatory products may be successfully used for regulators 251 and 253, as long as they are appropriately sensitive in the range of pressures disclosed therein.

Test apparatus 250 is necessarily very sensitive, so that even small leaks will be detected, as required by new vehicle vapor emission control laws now being passed in Congress. Test apparatus 250 is so sensitive that experimental testing surprisingly and unexpectedly revealed that substantial changes in atmospheric pressure could adversely affect its performance when conducting a test, such as by affecting the precision, accuracy, or reliability of transducer 100. Also, even though the pressure regulator 251 is pressure compensated, experiments that we have conducted show that the pressure compensating feature may not work adequately due to the fact that the operating test pressure in apparatus 250 is operating at a low pressure of only 13.8 to 14.2 inches water. The adjustable regulator 253 allows accurate adjustment of the operating test pressure up to about 40 inches water, but typically within the range of about 13.8 to 14.2 inches water. Since 1 psi is equal to about 28.0 inches water, it is apparent that the level of control provided by adjustable regulator 253 is quite fine. Notably, the low operating pressure is required when pressurizing the fuel holding system so that the fuel tank does not expand unacceptably like a balloon when its atmosphere is pressurized. The adjustability of the adjustable regulator 253 is controlled by an adjustment knob 254 that extends outside the cabinet 57. A spacer 258 is placed between the adjusting knob 254 and the body of the regulator 253 for controlling the adjustability of the knob 254. The adjustable regulator 253 can be adjusted in many different ways. For example, if the absolute atmospheric pressure is known, the adjustable regulator 253 can be adjusted to a corresponding setting. Alternatively, the adjustable regulator 253 can be adjusted by attaching adapter 34 to a fuel-tank-simulating device having a known leak rate. The adjustable regulator 253 can then be adjusted by trial and error or according to a correction chart.

Thus, an emissions test apparatus for testing for vapor emitting leaks in a vehicle fuel holding system is provided. The test apparatus includes an adjustable pressure regulator and a surge protector operably connected to a line for pressurizing the fuel holding system. A pressure sensor operably connected to the line is protected by the surge protector and is configured to accurately measure pressure changes in the fuel holding system, such that an accurate pass/fail test can be conducted on the fuel holding system in compliance with a government standard concerning evaporative emission leak rates.

In the foregoing description, it will be readily appreciated by those skilled in the art that modifications may be made to the invention without departing from the concepts disclosed herein. Such modifications are to be considered as included in the following claims, unless these claims by their language expressly state otherwise.

We claim:

1. An emissions test apparatus for testing for vapor emitting leaks in a fuel holding system in a vehicle, the fuel holding system including a vehicle fuel tank and a fuel vapor control system operably connected to the fuel tank, the fuel tank and the fuel vapor control system defining an atmosphere, comprising in combination:

a pressurizing system including:

a first pressure regulator configured for connection to a source of pressurized gas for regulating a maximum first pressure in the apparatus downstream of the first pressure regulator;

a first surge protector connected to said first pressure regulator for controlling first surges from the first pressure regulator;

an adjustable second pressure regulator operably connected to the first surge protector for adjustably regulating a test-initiating second pressure of pressurized gas for operating the apparatus, the second pressure regulator including an adjustment knob positioned in a readily accessible position so that the pressure downstream of the second pressure regulator can be adjusted for changes in ambient atmospheric pressure;

a line extending from the second pressure regulator for operably connecting the second pressure regulator to the fuel holding system; and a pressure-monitoring system including:

a pressure sensor for measuring the pressure of said atmosphere in the fuel holding system;

a timer for indicating passage of a predetermined amount of time;

a switch for actuating said timer when the test-initiating second pressure is reached in the atmosphere in the fuel holding system; and an indicator operably connected to said pressure sensor, said timer and said switch, said indicator being configured to indicate that a change in the pressure of said atmosphere over said predetermined time is acceptable or unacceptable.

2. The emissions test apparatus defined in claim 1, wherein the pressure sensor has a construction and pressure sensitivity such that the pressure sensor is damaged by a surge of more than about one psi.

3. The emissions test apparatus defined in claim 2, wherein the pressure sensor includes a transducer.

4. The emissions test apparatus defined in claim 3, wherein the second pressure regulator is configured to adjustably control the downstream pressure to a range of about 0" to 40" water.

5. The emissions test apparatus defined in claim 4, wherein the first pressure regulator controls the maximum downstream pressure to about 0–100 psi.

6. The emissions test apparatus defined in claim 5, wherein the first pressure regulator comprises a two stage regulator.

7. The emissions test apparatus defined in claim 1, including an enclosure for enclosing at least the pressure regulator, and wherein the adjustment knob is positioned outside the enclosure in an easily accessible position.

8. The emissions test apparatus defined in claim 7, including a spacer placed between the adjustment knob and a body of the regulator.

9. The emissions test apparatus defined in claim 2, wherein the second pressure regulator controls the downstream pressure to a maximum of about 40" water.

10. The emissions test apparatus defined in claim 2, wherein the first pressure regulator controls the maximum downstream pressure to about 0–100 psi.

11. The emissions test apparatus defined in claim 1, including a control valve located after said second surge protector.

12. The emissions test apparatus defined in claim 1, wherein the first pressure regulator, the first surge protector, the adjustable second surge protector, and the pressure sensor are connected in series in the respective listed order.

13. The emissions test apparatus defined in claim 1, including an adapter connected to the line for sealingly engaging a mating member on the fuel holding system.

14. The emissions test apparatus defined in claim 13, wherein the adapter is configured to mateably engage a fill tube on the fuel holding tank.

15. An emissions test apparatus for testing for vapor emitting leaks in a fuel holding system in a vehicle, the fuel holding system including a vehicle fuel tank and a fuel vapor control system operably connected to the fuel tank, the fuel tank and the fuel vapor control system defining an atmosphere, comprising:

a cabinet; and a system-pressurizing and pressure-monitoring pneumatic circuit mounted to the cabinet including:

a connector for connection to a source of pressurized gas;

an adjustable pressure regulator operably connected to said connector and mounted in said cabinet for adjustably regulating an operating pressure of the apparatus downstream of the adjustable pressure regulator, the pressure regulator including an adjustment knob positioned in a readily accessible position on the cabinet so that the pressure downstream of the pressure regulator can be adjusted to compensate for changes in ambient atmospheric pressure;

a surge protector operably connected to the adjustable pressure regulator for controlling pressure surges in the circuit;

a line for communicating the pressurized gas from the circuit to the fuel holding system; and an indicator mechanism, operably connected to one of said surge protector and said line, for indicating that a timed change in the pressure of the atmosphere over said predetermined time is acceptable or unacceptable, said indicator mechanism including a pressure sensor for continuously monitoring the pressure in the atmosphere in the fuel holding system.

16. The emissions test apparatus defined in claim 15 including a second surge protector for controlling a maximum second magnitude surge in the apparatus, the second magnitude surges being substantially less than said first magnitude surges.

17. The emissions test apparatus defined in claim 15, wherein the pressure sensor and the adjustable pressure regulator are located in a protected position in the cabinet.

18. The emissions test apparatus defined in claim 15 including an adapter connected to the line and configured for connection to a fuel fill tube on the fuel tank.

19. The emissions test apparatus defined in claim 15, wherein the circuit includes another pressure regulator configured for connection to a source of pressurized gas for regulating a maximum pressure delivered from the source of pressurized gas to the apparatus.

20. The emissions test apparatus defined in claim 19, wherein the pressure sensor has a construction and pressure sensitivity such that the pressure sensor is damaged by a pressure surge of more than about one psi.

21. The emissions test apparatus defined in claim 20, wherein the pressure sensor is a transducer.

22. The emissions test apparatus defined in claim 15, wherein the pressure regulator adjustably controls the downstream pressure to a range of about 13.8–14.2" water.

23. The emissions test apparatus defined in claim 15, wherein the adjustment knob extends from the cabinet.

24. The emissions test apparatus defined in claim 23, including a spacer placed between the adjustment knob and a body of the regulator for limiting the adjustability of the adjustment knob.

25. The emissions test apparatus defined in claim 15, wherein the surge protector is configured to control the magnitude of the pressure surges to less than about 1" water.

26. The emissions test apparatus defined in claim 15, including a control valve located downstream of said surge protector.

27. A method of testing for vapor emitting leaks in a fuel holding system in a vehicle, the fuel holding system including a vehicle fuel tank and a fuel vapor control system operably connected to the fuel tank, the fuel tank and the fuel vapor control system defining an atmosphere, comprising steps of:

providing a portable evaporative emissions test apparatus including a line connected to a source of pressurized gas and to the fuel holding system; a first surge protector operably connected in the line; an adjustable pressure regulator operably connected in the line and to the first surge protector, the adjustable pressure regulator including an adjustment knob positioned in a readily accessible position on the apparatus; a pressure sensor operably connected to said line; and an indicator mechanism operably connected to said pressure sensor;

adjusting the adjustable pressure regulator to compensate for changes in ambient atmospheric pressure;

pressurizing the fuel holding system with a surge-controlled input of pressurized gas;

measuring the change in pressure in the fuel holding system over a predetermined period of time; and indicating that a problem exists if the pressure change is greater than the acceptable change.

28. The method defined in claim 27, including providing a second surge protector operably connected to the pressure sensor upstream of the pressure sensor, and operating the second surge protector to prevent damage to the pressure sensor from pressure surges.

29. The method defined in claim 28; wherein the step of operating the second surge protector includes controlling surges to less than about one psi amplitude.

* * * * *